US012113309B2

(12) United States Patent
Moll et al.

(10) Patent No.: US 12,113,309 B2
(45) Date of Patent: Oct. 8, 2024

(54) CONNECTOR FOR A FLAT FLEXIBLE CABLE

(71) Applicant: TE Connectivity Services GmbH, Schaffhausen (CH)

(72) Inventors: Hurley Chester Moll, Hershey, PA (US); John Mark Myer, Millersville, PA (US); Forrest Irving Kinsey, Jr., Harrisburg, PA (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 16/919,824

(22) Filed: Jul. 2, 2020

(65) Prior Publication Data

US 2022/0006222 A1 Jan. 6, 2022

(51) Int. Cl.
*H01R 12/69* (2011.01)
*H01R 12/81* (2011.01)
*H01R 13/502* (2006.01)

(52) U.S. Cl.
CPC ............. *H01R 12/81* (2013.01); *H01R 12/69* (2013.01); *H01R 13/502* (2013.01)

(58) Field of Classification Search
None
See application file for complete search history.

(56) References Cited

U.S. PATENT DOCUMENTS 3,633,189 A * 1/1972 Billawala ................. G11B 5/17 360/245.8
3,697,925 A * 10/1972 Henschen .............. H01R 12/69 439/494
4,160,573 A * 7/1979 Weisenburger ........ H01R 12/69 439/400
6,007,371 A * 12/1999 Hickox .................. H01R 12/61 439/498
6,464,534 B1 * 10/2002 Schramme ........... H01R 12/771 439/353
6,572,398 B2 * 6/2003 Onuma .................. H01R 12/68 439/422
6,746,269 B1 * 6/2004 Casses ................... H01R 43/05 439/422
7,001,205 B2 * 2/2006 Godefroy ............... H01R 13/11 439/409
7,232,334 B2 * 6/2007 Shimizu ............... H01R 12/771 439/496
7,273,388 B2 * 9/2007 Kumakura ............. H01R 12/68 439/422
7,468,705 B2 * 12/2008 Mayr ....................... H05K 7/02 343/745
8,215,980 B1 * 7/2012 Lin ...................... H01R 4/2433 439/404
10,756,463 B2 * 8/2020 Hiroki .................... H01R 12/59

* cited by examiner

*Primary Examiner* — Felix O Figueroa

(57) ABSTRACT

A connector for a flat flexible cable includes a housing portion and a plurality of terminals. The housing portion has a retention section and a crimping section. The retention section has a plurality of terminal receiving passageways. The plurality of terminals each have a contact portion held in one of the plurality of terminal receiving passageways and a crimping portion exposed in the crimping section. A plurality of conductors exposed in a window extending through an insulation material of the flat flexible cable are each crimped in the crimping portion of one of the plurality of terminals.

21 Claims, 7 Drawing Sheets

CONNECTOR FOR A FLAT FLEXIBLE CABLE

FIELD OF THE INVENTION

The present disclosure relates to a connector and, more particularly, to a connector for a flat flexible cable.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional “round wire” counter parts. Specifically, in addition to having a lower profile and lighter weight, FFCs enable the implementation of large circuit pathways with significantly greater ease compared to round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.), each having established, and in some cases standardized, connector or interface types. Accordingly, a critical obstacle preventing the implementation of FFCs into these applications includes the need to develop quick, robust, and low resistance termination techniques which enable an FFC to be connectorized for mating with these existing connections.

A typical FFC may be realized by applying insulation material to either side of a pre-patterned thin foil conductor, and bonding the sides together via an adhesive to enclose the conductor therein. Current FFC terminals include piercing-style crimp terminals, wherein sharpened tines of a terminal are used to pierce the insulation and adhesive material of the FFC in order to attempt to establish a secure electrical connection with the embedded conductor.

Due in part to the fragile nature of the thin foil conductor material, these types of terminals have several drawbacks, including much higher electrical resistances than conventional round wire F-crimps, inconsistent electrical connectivity between the conductor and the terminal, and mechanical unreliability over time in harsh environments. Further, a connector to which an FFC is terminated includes a plurality of terminals that each must be crimped to establish the electrical connection with the embedded conductor. Current FFC terminal connectors require complex equipment to terminate the crimp and are inefficient by requiring individualized crimping of the terminals.

SUMMARY

A connector for a flat flexible cable includes a housing portion and a plurality of terminals. The housing portion has a retention section and a crimping section. The retention section has a plurality of terminal receiving passageways. The plurality of terminals each have a contact portion held in one of the plurality of terminal receiving passageways and a crimping portion exposed in the crimping section. A plurality of conductors exposed in a window extending through an insulation material of the flat flexible cable are each crimped in the crimping portion of one of the plurality of terminals.

BRIEF DESCRIPTION OF THE DRAWINGS

The invention will now be described by way of example with reference to the accompanying Figures, of which.

DETAILED DESCRIPTION OF THE EMBODIMENTS

Figure 1:
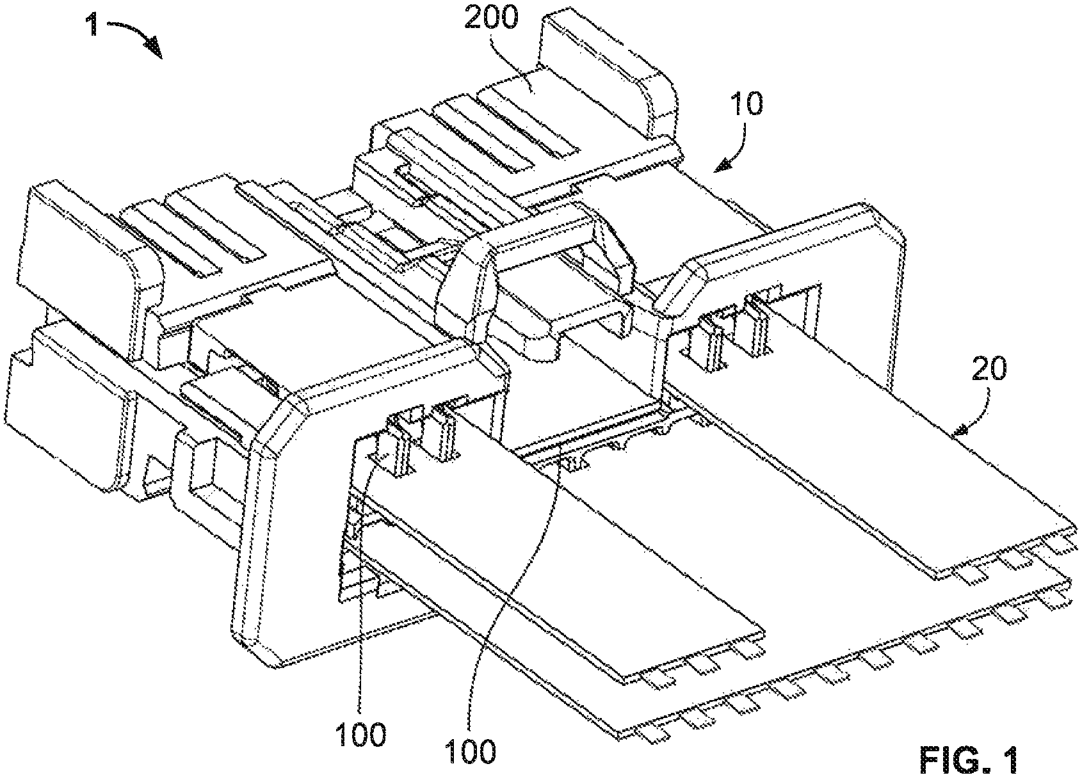
FIG. 1 is a perspective view of a connector assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A connector assembly 1 according to an embodiment, as shown in FIG. 1, comprises a connector 10 and a flat flexible cable 20 connected to the connector 10. The connector 10 includes an inner housing 100 insertable into an outer housing 200 and a plurality of terminals 300, visible for example in FIGS. 7-10, held in the inner housing 100. The connector assembly 1 is shown in a fully assembled state in FIG. 1, as will be described in greater detail below.

Figure 2:
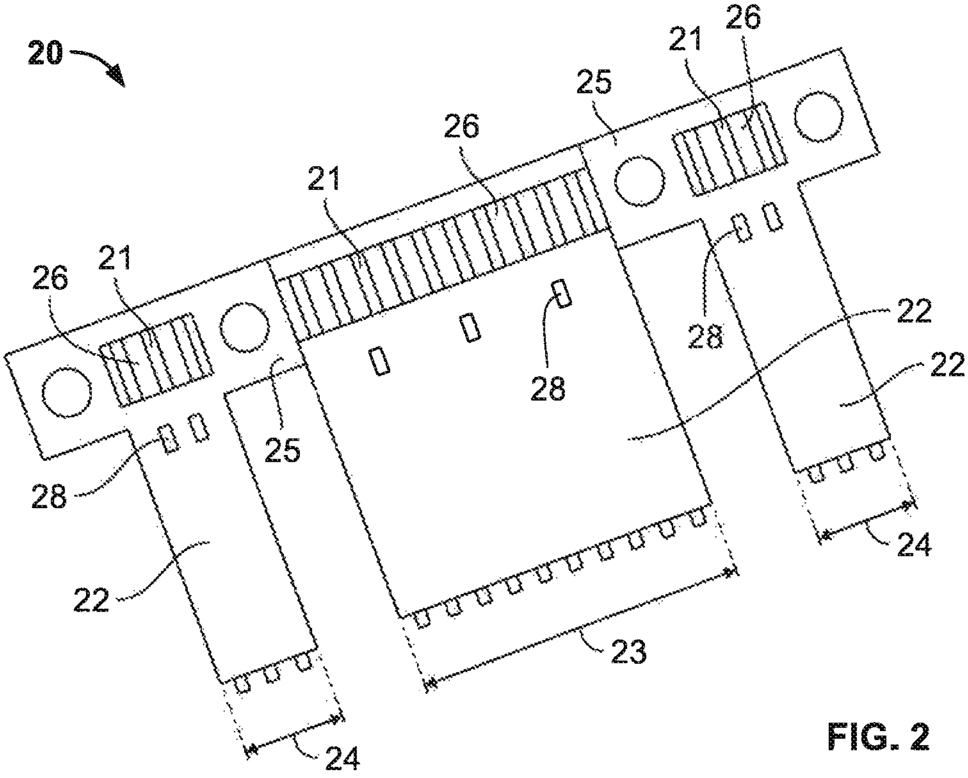
FIG. 2 is a perspective view of a flat flexible cable of the connector assembly.

The flat flexible cable (FFC) 20 is shown in FIG. 2. The FFC 20 includes a plurality of conductors 21 embedded within an insulation material 22. In an embodiment, the conductors 21 are each a metallic foil, such as a copper foil, by way of example only, patterned in any desirable configuration. The insulation material 22, such as a polymer insulation material, may be applied to either or both sides of the conductors 21 via an adhesive material.

As shown in FIG. 2, the FFC 20 includes a plurality of segments 23, 24 including a first segment 23 and a pair of second segments 24. Each of the segments 23, 24 has a plurality of conductors 21 embedded in the insulation material 22. The insulation material 22 of each of the pair of second segments 24 is connected to the insulation material 22 of the first segment 23 by a carrier strip 25.

The FFC 20 has a plurality of windows 26 and a plurality of openings 28 extending through the insulation material 22 of the segments 23, 24, as shown in FIG. 2. The windows 26 and openings 28 are an absence of the insulation material 22. The conductors 21 of each of the segments 23, 24 are exposed in the windows 26. The openings 28 of the FFC 20 are formed in the insulation material 22 of the segments 23, 24 outside of and unconnected with the windows 26. In the shown embodiment, the conductors 21 are not exposed in the openings 28.

Figure 3:
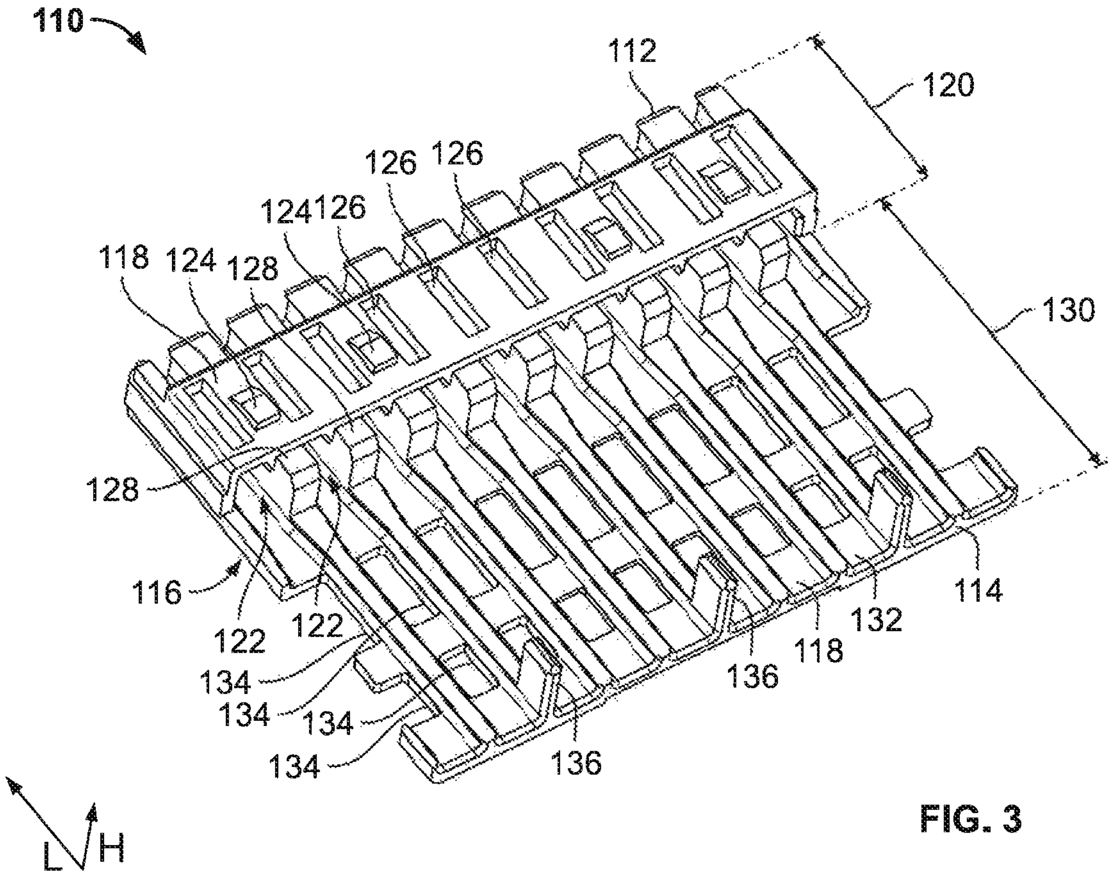
FIG. 3 is a perspective view of a first inner housing portion of an inner housing of the connector assembly.

The inner housing 100 includes a first inner housing portion 110, shown in FIG. 3. The first inner housing portion 110 has a mating end 112 and a rear end 114 opposite the mating end 112 in a longitudinal direction L. The first inner housing portion 110 has an interior surface 116 and an exterior surface 118 opposite the interior surface 116 in a height direction H perpendicular to the longitudinal direction L.

The first inner housing portion 110, as shown in FIG. 3, has a retention section 120 starting at the mating end 112 and a crimping section 130 extending from the retention section 120 to the rear end 114 in the longitudinal direction L. In the embodiment shown in FIG. 3, the first inner housing portion 110 is monolithically formed in a single piece from an insulative material.

Figure 6:
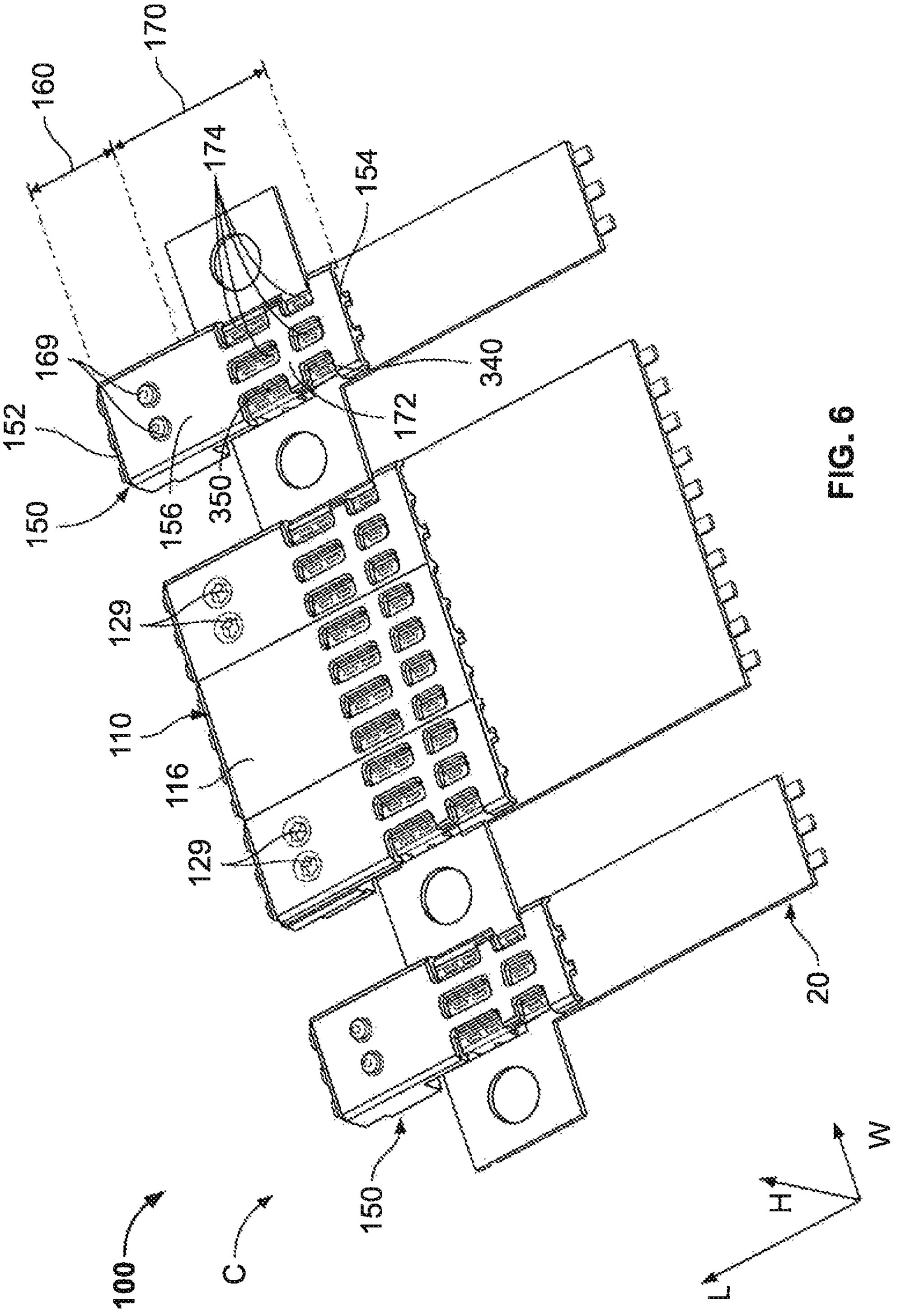
FIG. 6 is a bottom perspective view of the inner housing with the plurality of terminals and the flat flexible cable.

The retention section 120, as shown in FIG. 3, has a plurality of terminal receiving passageways 122 extending through the retention section 120 in the longitudinal direction L. The retention section 120 has a plurality of retention protrusions 124 and a plurality of locking recesses 126 positioned on the exterior surface 118. The retention protrusions 124 extend from the exterior surface 118 and the locking recesses 126 extend through the exterior surface 118 of the retention section 120 in the height direction H. Each of the locking recesses 126 is aligned with one of the terminal receiving passageways 122 in the height direction H. A plurality of separating walls 128 separate the terminal receiving passageways 122 from one another. On the interior surface 116, as shown in FIG. 6, the retention section 120 has a plurality of peg recesses 129 extending into the retention section 120 in the height direction H.

The crimping section 130, as shown in FIG. 3, has a base 132 and a plurality of voids 134 extending through the base 132 in the height direction H from the exterior surface 118 to the interior surface 116. In the shown embodiment, a pair of voids 134 separated from one another in the base 132 in the longitudinal direction L are aligned with each of the terminal receiving passageways 122 in the longitudinal direction L. The crimping section 130 has a plurality of securing elements 136 extending from the exterior surface 118 in the height direction H. In the shown embodiment, the securing elements 136 are positioned at the rear end 114. In other embodiments, the securing elements 136 may be positioned elsewhere on the base 132 along the longitudinal direction L.

Figure 4:
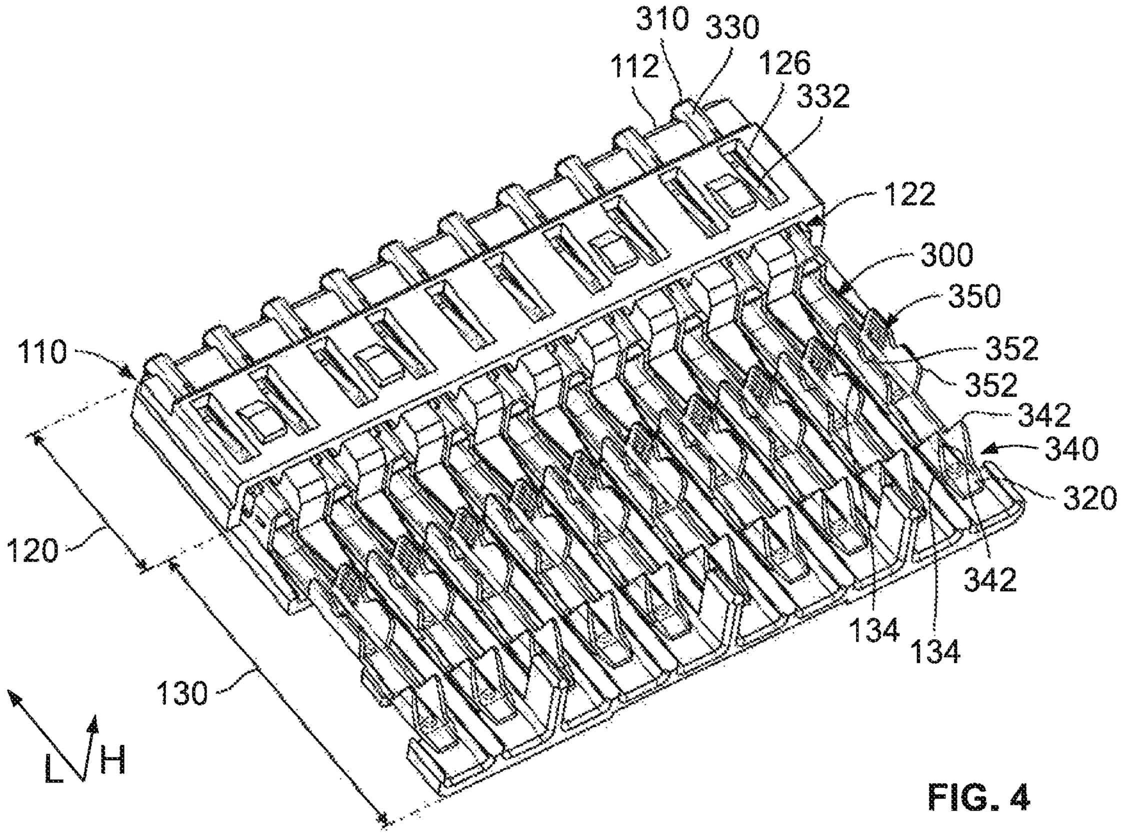
FIG. 4 is a perspective view of a plurality of terminals of the connector assembly in the first inner housing portion.

The terminals 300 are shown disposed in the first inner housing portion 110 in FIG. 4. As shown in FIG. 4, the terminals 300 each have a mating end 310 and a rear end 320 opposite the mating end 310 in the longitudinal direction L. The terminals 300 each have a contact portion 330 at the mating end 310, a piercing portion 340 at the rear end 320, and a crimping portion 350 between the contact portion 330 and the piercing portion 340. The contact portion 330 is adapted to electrically connect with a mating contact portion. In the shown embodiment, the contact portion 330 is a female contact portion, but could be a male contact portion in another embodiment. The contact portion 330 has a locking feature 332. In the shown embodiment, the piercing portion 340 has a pair of piercing tines 342 and the crimping portion 350 has a pair of crimping wings 352. In other embodiments, the piercing portion 340 and crimping portion 350 may have other types of piercing elements and crimping elements, respectively, used in electrical terminals.

As shown in FIG. 4, in a locking position of the terminals 300 in the first inner housing portion 110, the contact portion 330 of each of the terminals 300 is held in one of the plurality of terminal receiving passageways 122 and the crimping portion 350 of each of the terminals 300 is exposed in the crimping section 130. The locking feature 332 of each terminal 300 engages one of the locking recesses 126 of the retention section 120 to hold the terminal 300 in the locking position in the first inner housing portion 110. The contact portion 330 of each of the terminals 300 protrudes beyond the mating end 112 of the first inner housing portion 110 in the longitudinal direction L when the terminal 300 is in the locking position. The piercing portion 340 of each of the terminals 300 is aligned with one of the voids 134 in the height direction H, and the crimping portion 350 of each of the terminals 300 is aligned with one of the voids 134 in the height direction H.

Figure 5:
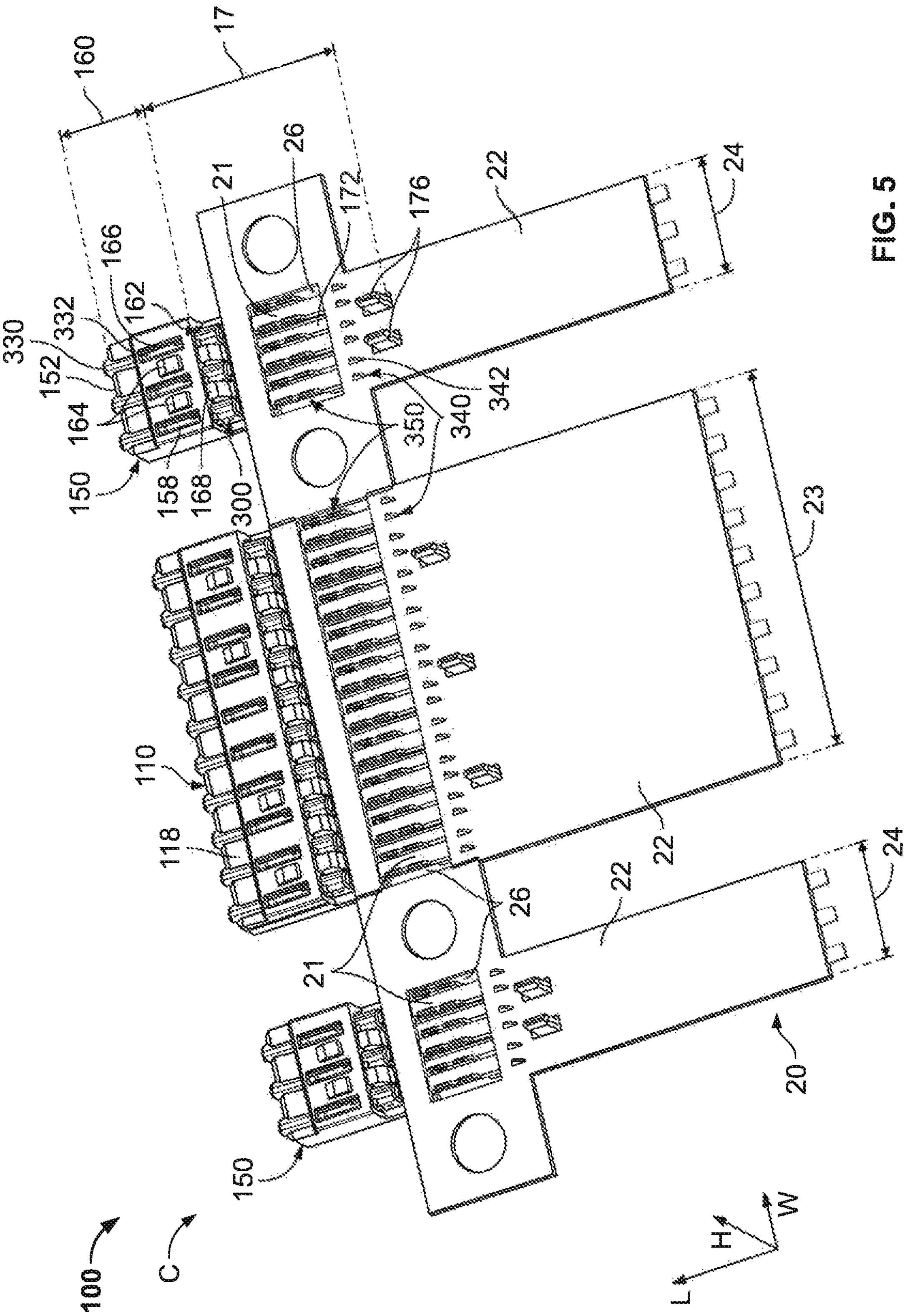
FIG. 5 is a top perspective view of an inner housing of the connector assembly in a crimping position with the plurality of terminals and the flat flexible cable.

The inner housing 100, in the embodiment shown in FIGS. 5 and 6, includes the first inner housing portion 110 described in detail above and a pair of second inner housing portions 150 separate from the first inner housing portion 110. Each of the second inner housing portions 150, as described in detail below, is structured similarly to the first inner housing portion 110 and similarly receives the terminals 300. In FIGS. 5 and 6, the elements of only one of the second inner housing portions 150 are labeled with reference numbers for clarity of the figures, however, the second inner housing portions 150 are identical and the labeled reference numbers and corresponding description apply to both second inner housing portions 150.

Each of the second inner housing portions 150, as shown in FIGS. 5 and 6, has a mating end 152 and a rear end 154 opposite the mating end 152 in the longitudinal direction L. Each second inner housing portion 150 has an interior surface 156 and an exterior surface 158 opposite the interior surface 156 in a height direction H perpendicular to the longitudinal direction L.

Each second inner housing portion 150, as shown in FIGS. 5 and 6, has a retention section 160 starting at the mating end 152 and a crimping section 170 extending from the retention section 160 to the rear end 154 in the longitudinal direction L. In the embodiment shown in FIGS. 5 and 6, each of the second inner housing portions 150 is monolithically formed in a single piece from an insulative material.

The retention section 160, as shown in FIG. 5, has a plurality of terminal receiving passageways 162 extending through the retention section 160 in the longitudinal direction L. In the shown embodiment, each of the second inner housing portions 150 has a width smaller than a width of the first inner housing portion 110 in a width direction W perpendicular to the longitudinal direction L and the height direction H. Each of the second inner housing portions 150 has a smaller number of terminal receiving passageways 162 than the number of terminal receiving passageways 122 in the first inner housing portion 110. In the shown embodiment, each of the second inner housing portions 152 has three terminal receiving passageways 162 and the first inner housing portion 110 has ten terminal receiving passageways 122. In other embodiments, the second inner housing portions 150 may have any other number of terminal receiving passageways 162 relative to the number of terminal receiving passageways 122 of the first inner housing portion 110.

The retention section 160, as shown in FIGS. 5 and 6, has a plurality of retention protrusions 164 and a plurality of locking recesses 166 positioned on the exterior surface 158. The retention protrusions 164 extend from the exterior surface 158 and the locking recesses 166 extend through the exterior surface 158 of the retention section 160 in the height direction H. Each of the locking recesses 166 is aligned with one of the terminal receiving passageways 162 in the height direction H. A plurality of separating walls 168 separate the terminal receiving passageways 162 from one another. On the interior surface 156, as shown in FIG. 6, the retention section 160 has a plurality of pegs 169 extending from the retention section 160 in the height direction H.

The crimping section 170 of each of the second inner housing portions 150, as shown in FIGS. 5 and 6, has a base 172 and a plurality of voids 174 extending through the base 172 in the height direction H from the exterior surface 158 to the interior surface 156. In the shown embodiment, a pair of voids 174 separated from one another in the base 172 in the longitudinal direction L are aligned with each of the terminal receiving passageways 162 in the longitudinal direction L. The crimping section 170 has a plurality of securing elements 176 extending from the exterior surface 158 in the height direction H. In the shown embodiment, the securing elements 176 are positioned at the rear end 154. In other embodiments, the securing elements 176 may be positioned elsewhere on the base 172 along the longitudinal direction L.

The terminals 300 are shown disposed in the second inner housing portions 150 in a locking position in FIGS. 5 and 6. In the locking position, the contact portion 330 of each of the terminals 300 is held in one of the plurality of terminal receiving passageways 162 and the crimping portion 350 of each of the terminals 300 is exposed in the crimping section 170. The locking feature 332 of each terminal 300 engages one of the locking recesses 166 of the retention section 160 to hold the terminal 300 in the locking position in the second inner housing portions 150. The contact portion 330 of each of the terminals 300 protrudes beyond the mating end 152 of the second inner housing portions 150 in the longitudinal direction L when the terminal 300 is in the locking position. The piercing portion 340 of each of the terminals 300 is aligned with one of the voids 174 in the height direction H, and the crimping portion 350 of each of the terminals 300 is aligned with one of the voids 174 in the height direction H.

The FFC 20 is shown positioned in a crimping position C on the inner housing 100 in FIGS. 5 and 6. The first inner housing portion 110 and the second inner housing portions 150 are positioned with the exterior surface 118, 158 facing in the same direction. The conductors 21 exposed in the window 26 of the first segment 23 are positioned within the crimping portions 350 of the terminals 300 in the crimping section 130 of the first inner housing portion 110. The conductors 21 exposed in the windows 26 of the second segments 24 are positioned within the crimping portions 350 of the terminals 300 in the crimping section 170 of the second inner housing portions 150.

As shown in FIG. 5, with the FFC 20 positioned on the inner housing 100, the piercing portion 340 of each of the terminals 300 extends through and is secured to the insulation material 22. In the shown embodiment, the piercing tines 342 are bent over the insulation material 22 to secure to the insulation material 22. A tool may be disposed in the voids 134, 174 under the piercing portions 340 to support the piercing portions 340 during bending of the piercing tines 342. The securing elements 136, 176 extend through the openings 28 of the insulation material 22. The piercing portions 340 and the securing elements 136, 176 provide forms of strain relief for the resulting connection, mechanically securing the position of the FFC 20 relative to the terminals 300 and the inner housing 100.

From the crimping position C shown in FIGS. 5 and 6, the conductors 21 exposed in the window 26 of the first segment 23 are crimped in the crimping portions 350 of the terminals 300 in the first inner housing portion 110. The conductors 21 exposed in the windows 26 of the second segments 24 are crimped in the crimping portions 350 of the terminals 300 in the second inner housing portions 150. The terminals 300 in the first inner housing portion 110 and the second inner housing portions 150 are positioned in a single row in the crimping position C and are simultaneously crimped to the conductors 21. A portion of a crimping tool is disposed in the voids 134, 174 under the crimping portions 350 to support the crimping portions 350 during crimping.

Figure 7:
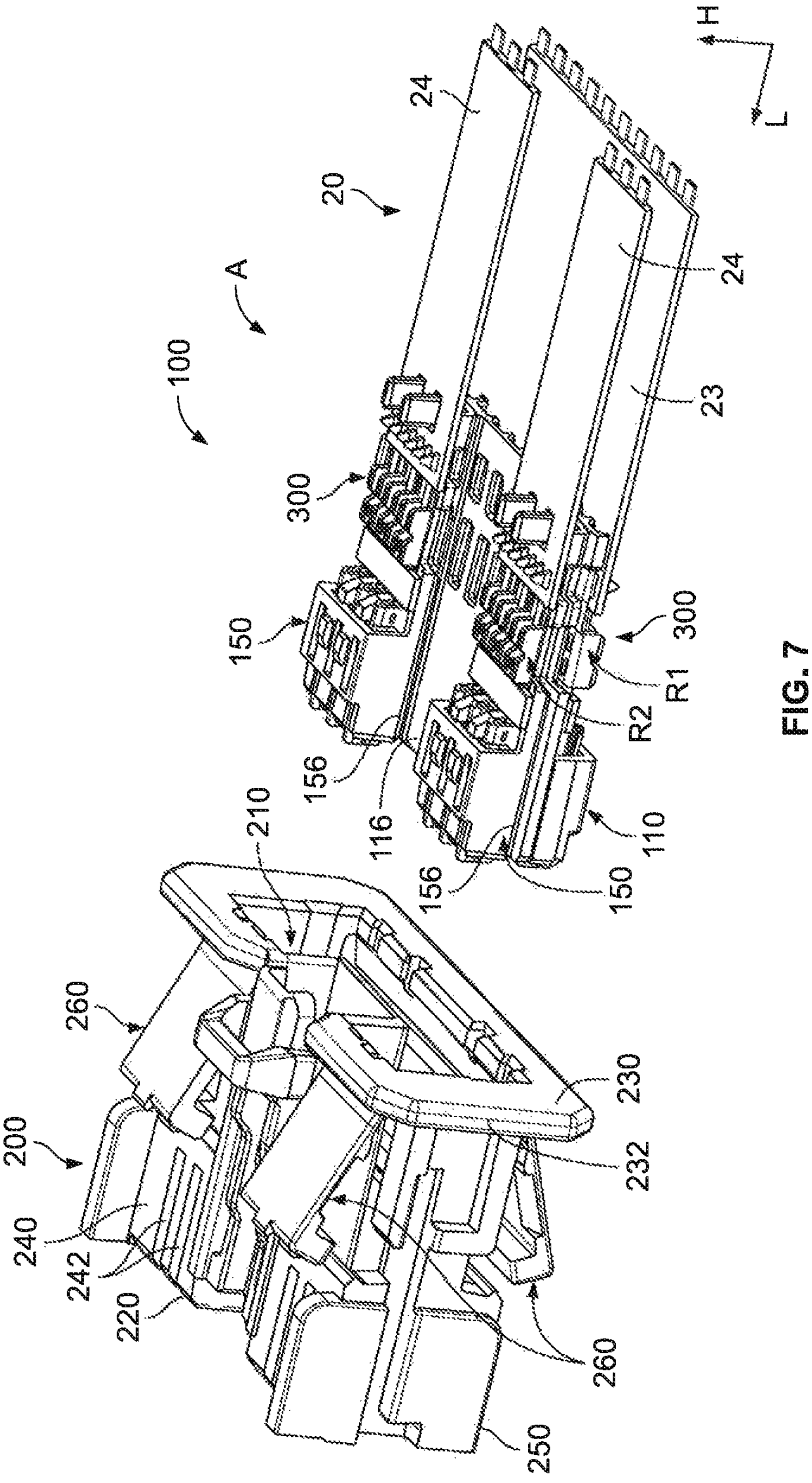
FIG. 7 is a perspective view of an outer housing of the connector assembly with the inner housing in an assembled position.

From the crimping position C shown in FIGS. 5 and 6, the inner housing 100 crimped to the FFC 20 is moved into an assembled position A shown in FIG. 7. The piercing portions 340 and crimping portions 350 are shown uncrimped in FIG. 7 for clarity and ease of understanding of the correspondence of the elements with respect to the orientation shown in FIGS. 5 and 6. In the assembled position A, however, the piercing portions 340 and crimping portions 350 are crimped as described above, and are shown crimped FIGS. 8-10 described below.

As shown in FIG. 7, the second inner housing portions 150 are rotated 180° with respect to the first inner housing portion 110 from the crimping position C to the assembled position A and are attached to the first inner housing portion 110. In the assembled position A, the carrier strip 25 has been removed, separating the segments 23, 24 of the FFC 20. In the assembled position A, the interior surface 116 of the first inner housing portion 110 faces and abuts the interior surface 156 of each of the second inner housing portions 150.

Figure 9:
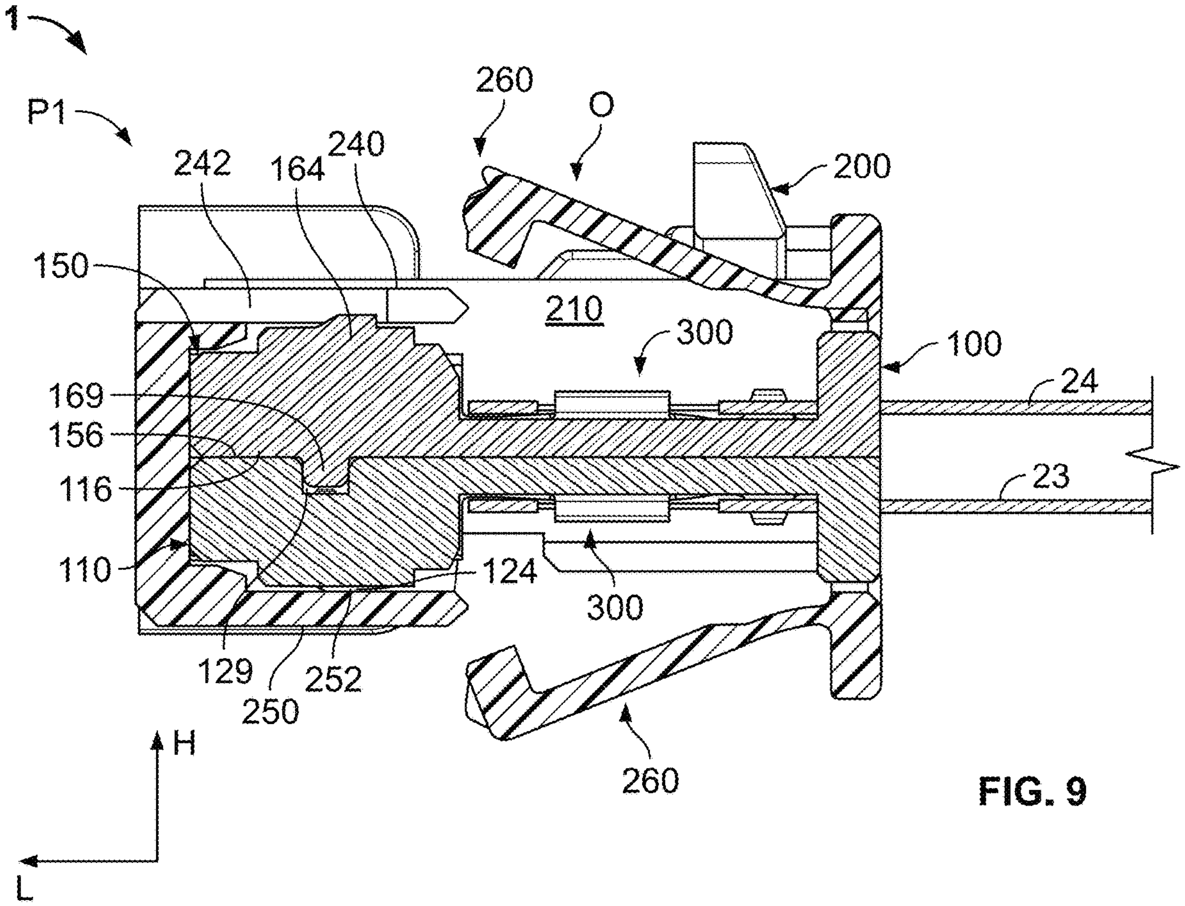
FIG. 9 is a sectional side view of the connector assembly with the inner housing in a retention position in the outer housing.

As shown in FIG. 9, each of the pegs 169 engages one of the peg recesses 129 to attach the pair of second inner housing portions 150 to the first inner housing portion 110. The terminals 300 are positioned in a pair of rows R1, R2 shown in FIG. 7 separated from one another in the height direction H in the assembled position A, with the terminals 300 in the first inner housing portion 110 positioned in a first row R1 and the terminals 300 of the second inner housing portions 150 positioned in a second row R2.

In the embodiment shown and described in FIGS. 5-7 above, the inner housing 100 includes the first inner housing portion 110 and the pair of second inner housing portions 150 to position the terminals in the pair of rows R1, R2. In another embodiment, in which only one row R1 of terminals 300 is needed in the connector 10, the inner housing 100 may only include the first inner housing portion 110. In such an embodiment, the first inner housing portion 110 may alternatively be referred to as just a "housing portion" or an "inner housing portion".

The outer housing 200, as shown in FIG. 7, has an inner housing receiving passageway 210 receiving the inner housing 100 in the assembled position A. The outer housing 200 extends from a mating end 220 to a housing receiving end 230 along the longitudinal direction L.

Figure 8:
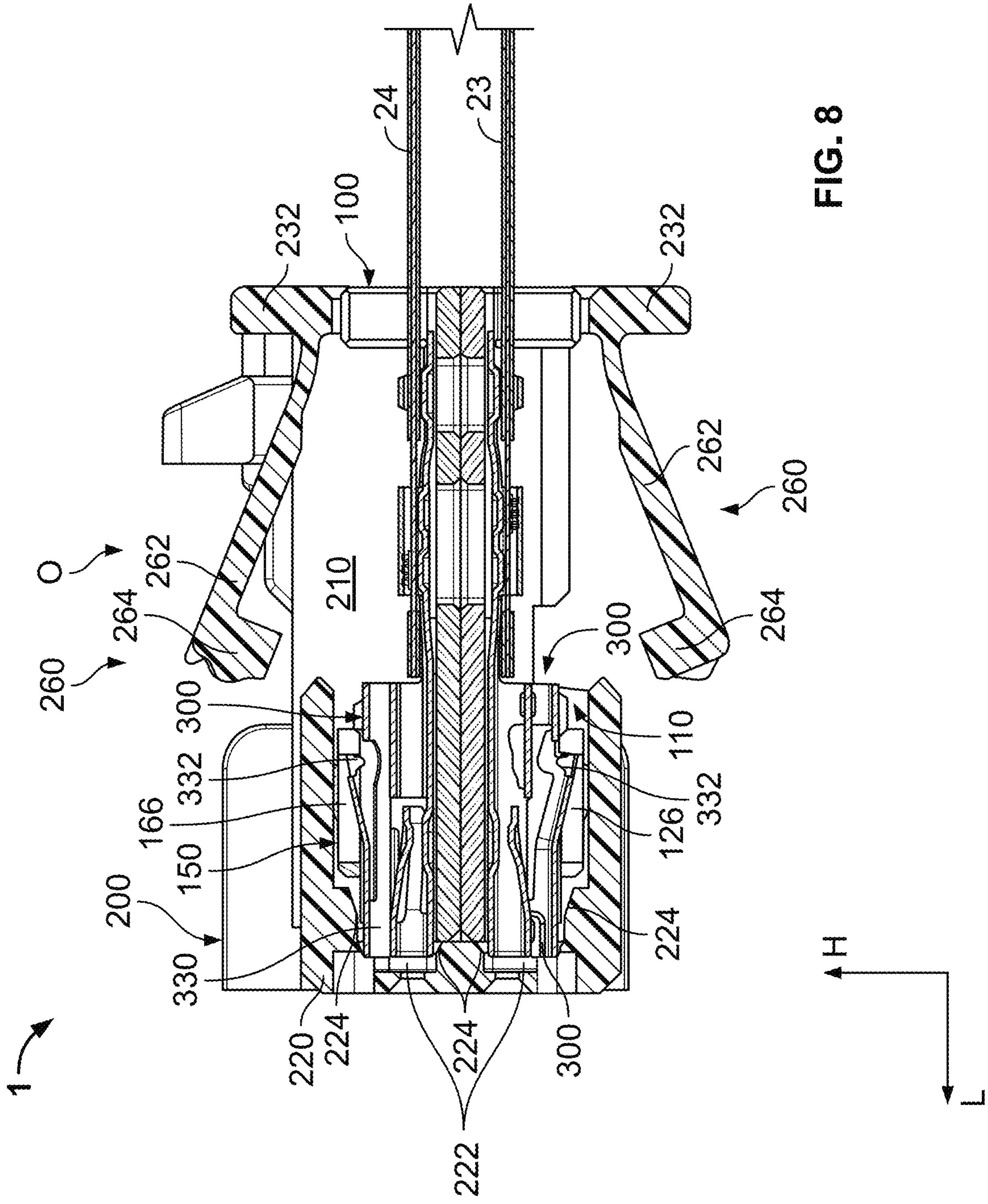
FIG. 8 is a sectional side view of the connector assembly with the inner housing disposed in the outer housing.

At the mating end 220, as shown in FIG. 8, the outer housing 200 has a plurality of terminal openings 222 extending through the outer housing 200 along the longitudinal direction L and into the inner housing receiving passageway 210. Each of the terminal openings 222 has a guiding slope 224 facing the inner housing receiving passageway 210.

The outer housing 200 has a flange 232 at the housing receiving end 230 and a plurality of secondary locking mechanisms 260 extending from the flange 232, as shown in FIGS. 7 and 8. Each of the secondary locking mechanisms 260, as shown in FIG. 8, has a cantilever 262 extending from the flange 232 to a wedge portion 264 at an end opposite the flange 232. The secondary locking mechanisms 260 are each pivotable with respect to the outer housing 200 between an open position O, shown in FIG. 8, and a secondary locking positon P2, shown in FIG. 10.

The outer housing 200 has an upper surface 240 and a lower surface 250 opposite the upper surface 240 in the height direction H, as shown in FIGS. 7 and 9. The upper surface 240 has a plurality of upper catching recesses 242 extending through the upper surface 240 in the height direction H and the lower surface 250 has a plurality of lower catching recesses 252 extending through the lower surface 250 in the height direction H.

As shown in FIGS. 7 and 8, with the inner housing 100 in the assembled position A, the inner housing 100 is inserted into the inner housing receiving passageway 210. The contact portion 330 of each of the terminals 300 abuts the guiding slope 224 of one of the plurality of terminal openings 222 to align the contact portion 330 with the one of the plurality of terminal openings 222 in the longitudinal direction L.

With the secondary locking mechanisms 260 in the open position O, as shown in FIGS. 8 and 9, the inner housing 100 reaches a retaining position P1 shown in FIG. 9. In the retaining position P1, the retention protrusions 124 of the first inner housing portion 110 each engage one of the lower catching recesses 252 and the retention protrusions 164 of the second inner housing portions 150 each engage one of the upper catching recesses 242. The inner housing 100 is thereby retained in the outer housing 200 in the retention position P1.

Figure 10:
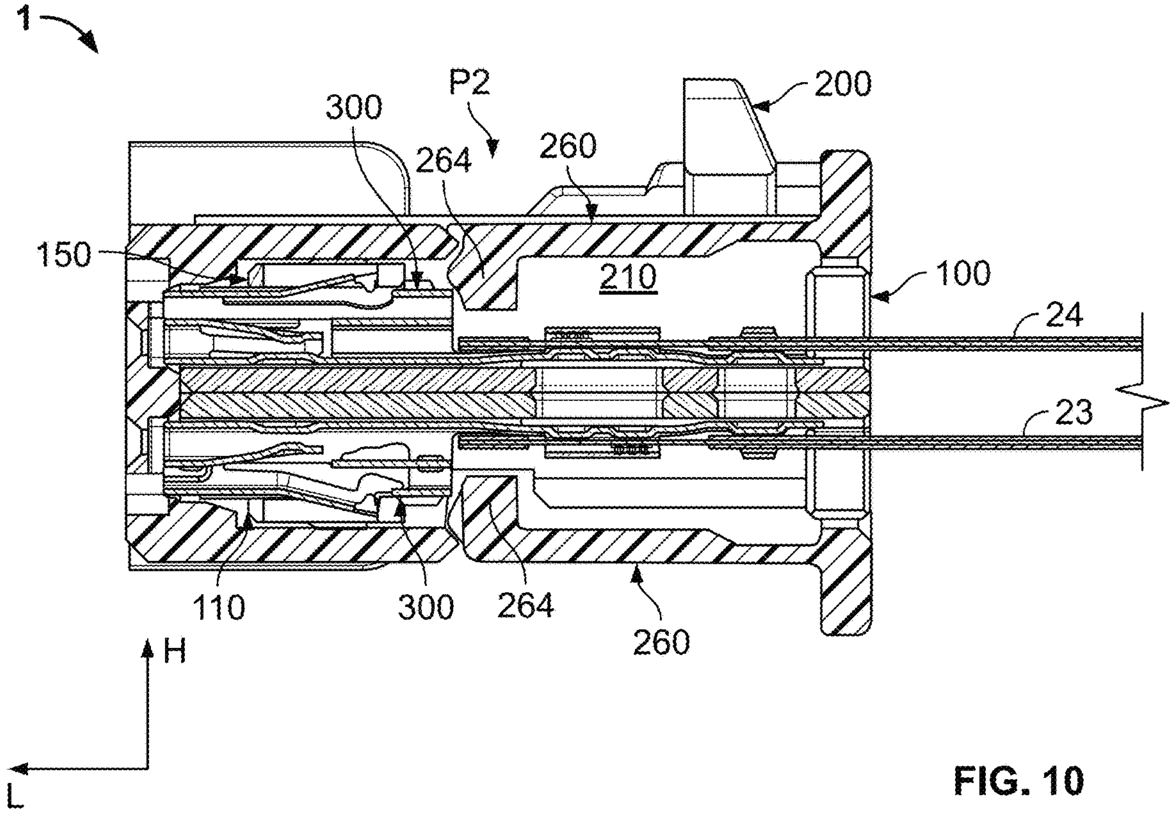
FIG. 10 is a sectional side view of the connector assembly with the inner housing in a secondary locking position in the outer housing.

With the inner housing 100 in the retained position P1, the secondary locking mechanisms 260 are pivoted from the open position O shown in FIG. 9 to the secondary locking position P2 shown in FIG. 10. In the secondary locking position P2, the wedge portion 264 of each of the secondary locking mechanisms 260 is positioned adjacent the terminals 300 in either the first inner housing portion 110 or the second inner housing portions 150. The secondary locking mechanisms 260 in the secondary locking position P2 prevent withdrawal of the terminals 300 in the longitudinal direction L, completing assembly of the connector assembly 1. The fully assembled connector assembly 1 is shown in FIGS. 1 and 10.

What is claimed is:

1. A connector assembly, comprising:

a flat flexible cable having an insulation material and a plurality of conductors exposed in a window extending through the insulation material; and a connector including:

a housing portion having a retention section and a crimping section, the retention section has a plurality of terminal receiving passageways, the crimping section is monolithically formed in a single piece with the retention section and includes a fixed securing element formed monolithically therewith and extending vertically upward through the flat flexible cable via an opening in the insulation material of the flat flexible cable outside of the window; and a plurality of terminals each having a contact portion held in one of the plurality of terminal receiving passageways and a crimping portion exposed in the crimping section, the conductors are each crimped in the crimping portion of one of the plurality of terminals, the crimping section has a base with a plurality of discrete voids extending through the base in a height direction perpendicular to a longitudinal direction of the terminal from an exterior surface of the base through to an interior surface of the base, the plurality of voids open to an outside of the base and an inside of the base in the height direction, the crimping portion of each of the terminals is aligned with one of the voids in the height direction.

2. The connector assembly of claim 1, wherein each of the plurality of terminals has a piercing portion extending through and secured to the insulation material of the flat flexible cable, the piercing portion of each of the terminals is aligned with one of the voids in the height direction.

3. The connector assembly of claim 2, wherein the plurality of voids include:

a plurality of first voids discrete from one another, the crimping portion of each of the terminals aligned with a corresponding one of the first voids in the height direction; and a plurality of second voids discrete from one another and from the plurality of first voids, the piercing portion of each of the terminals aligned with a corresponding one of the second voids in the height direction.

4. The connector assembly of claim 1, wherein the crimping portion is exposed in the crimping section opposite the base in the height direction.

5. The connector assembly of claim 1, wherein the plurality of discrete voids include a plurality of first voids discrete from one another, and a plurality of second voids discrete from one another.

6. A connector assembly, comprising:

a flat flexible cable having an insulation material and a plurality of conductors embedded in the insulation material, the plurality of conductors are exposed in a window extending through a portion of the insulation material, the insulation material is entirely removed from each surface of each of the conductors in the window for exposing the conductor continuously about its outer perimeter, the cable defining a retention opening in the insulation material outside of the window; and a connector including a housing portion and a plurality of terminals, the housing portion having a retention section and a crimping section, the retention section has a plurality of terminal receiving passageways, the plurality of terminals each having:

a contact portion held in one of the plurality of terminal receiving passageways;

a piercing portion extending through and secured to the insulation material of the flat flexible cable; and a crimping portion exposed in the crimping section, the plurality of conductors exposed in the window are each crimped in the crimping portion of one of the plurality of terminals, the crimping portion of each of the plurality of terminals directly contacts one of the conductors in the window, the crimping section including:

a fixed securing element formed monolithically therewith and extending upward through the flat flexible cable via the retention opening; and a base having a plurality of voids extending therethrough in a height direction perpendicular to a longitudinal direction of the plurality of terminals from an exterior surface of the base through to an interior surface of the base, the plurality of voids open to an outside of the base and an inside of the base in the height direction and including:

a plurality of first voids discrete from one another, the crimping portion of each of the terminals aligned with a corresponding one of the first voids in the height direction; and a plurality of second voids discrete from one another and from the first voids, the piercing portion of each of the terminals aligned with a corresponding one of the second voids in the height direction.

7. A connector assembly, comprising:

a flat flexible cable including a plurality of segments each having an insulation material and a plurality of conductors embedded in the insulation material, the plurality of conductors are exposed in a window extending through a portion of the insulation material in each of the segments; and a connector including:

an inner housing including a first inner housing portion and a pair of second inner housing portions separate from the first inner housing portion, the first inner housing portion and the pair of second inner housing portions each have a crimping section and a retention section with a plurality of terminal receiving passageways;

a plurality of terminals each having a contact portion held in one of the plurality of terminal receiving passageways and a crimping portion exposed in the crimping section, the plurality of conductors of a first segment of the plurality of segments are each crimped in the crimping portion of one of the plurality of terminals in the first inner housing portion and the plurality of conductors of a pair of second segments of the plurality of segments are each crimped in the crimping portion of one of the plurality of terminals in the pair of second inner housing portions, the crimping portion of each of the plurality of terminals directly contacts one of the conductors in the window, the contact portion of each of the terminals protrudes beyond a mating end of the first inner housing portion and the pair of second inner housing portions; and an outer housing having an inner housing receiving passageway receiving the inner housing and a plurality of terminal openings each having a guiding slope facing the inner housing receiving passageway, the contact portion of each of the terminals abuts the guiding slope of one of the plurality of terminal openings to align the contact portion with the one of the plurality of terminal openings.

8. A connector assembly, comprising:

a flat flexible cable including a plurality of segments each having an insulation material and a plurality of conductors embedded in the insulation material, the plurality of conductors are exposed in a window extending through a portion of the insulation material in each of the segments, the insulation material is entirely removed from all surfaces of each of the conductors in the window for exposing the conductor continuously about its outer perimeter, the cable defining a retention opening in the insulation material outside of the window; and a connector including:

an inner housing including a first inner housing portion and a pair of second inner housing portions separate from the first inner housing portion, the first inner housing portion and the pair of second inner housing portions each have a crimping section and a retention section with a plurality of terminal receiving passageways, the crimping section including a fixed securing element formed monolithically therewith and extending vertically upward through the flat flexible cable via the retention opening, each of the second inner housing portions having a width in a lateral direction of the connector that is less than a width of the first inner housing portion, the second inner housing portions arranged side-by-side on a common interior surface of the first inner housing portion in the lateral direction in an assembled position of the inner housing; and a plurality of terminals each having a contact portion held in one of the plurality of terminal receiving passageways and a crimping portion exposed in the crimping section, the plurality of conductors of a first segment of the plurality of segments are each crimped in the crimping portion of one of the plurality of terminals in the first inner housing portion and the plurality of conductors of a pair of second segments of the plurality of segments are each crimped in the crimping portion of one of the plurality of terminals in the pair of second inner housing portions, the crimping portion of each of the plurality of terminals directly contacts one of the conductors in the window.

9. The connector assembly of claim 8, wherein the crimping portions of the plurality of terminals in the first inner housing portion and the crimping portions of the plurality of terminals in the pair of second inner housing portions are simultaneously crimped to the plurality of conductors.

10. The connector assembly of claim 9, wherein the plurality of conductors are simultaneously crimped in a crimping position in which the plurality of terminals in the first inner housing portion and the plurality of terminals in the pair of second inner housing portions are positioned in a single row.

11. The connector assembly of claim 10, wherein the pair of second inner housing portions are directly attached to the interior surface of the first inner housing portion in the assembled position of the inner housing in which the plurality of terminals are positioned in a pair of rows separated from one another in a direction perpendicular to a longitudinal direction of the plurality of terminals.

12. The connector assembly of claim 11, wherein the pair of second inner housing portions are oriented in a position different by a 180° rotation between the crimping position and the assembled position.

13. The connector assembly of claim 11, wherein the first inner housing portion has a plurality of peg recesses on the interior surface and the pair of second inner housing portions each have a peg on an interior surface, the peg on each of the pair of second inner housing portions engages one of the plurality of peg recesses to attach the pair of second inner housing portions to the first inner housing portion.

14. The connector assembly of claim 11, further comprising an outer housing having an inner housing receiving passageway receiving the inner housing in the assembled position.

15. The connector assembly of claim 14, wherein each of the plurality of terminals has a locking feature engaging a locking recess of the retention section to hold the plurality of terminals in a locking position in each of the first inner housing portion and the pair of second inner housing portions.

16. The connector assembly of claim 15, wherein the contact portion of each of the terminals protrudes beyond a mating end of the first inner housing portion and the pair of second inner housing portions in the locking position.

17. The connector assembly of claim 16, wherein the outer housing has a plurality of terminal openings each having a guiding slope facing the inner housing receiving passageway, the contact portion of each of the terminals abuts the guiding slope of one of the plurality of terminal openings to align the contact portion with the one of the plurality of terminal openings.

18. The connector assembly of claim 14, wherein the first inner housing portion and the pair of second inner housing portions each have a retention protrusion positioned on an exterior surface of the retention section in the assembled position.

19. The connector assembly of claim 18, wherein the retention protrusion on each of the first inner housing portion and the pair of second inner housing portions engages a catching recess of the outer housing to retain the inner housing in the assembled position in the outer housing.

20. The connector assembly of claim 19, wherein the outer housing has a plurality of secondary locking mechanisms pivotable with respect to the outer housing between an open position and a secondary locking position.

21. The connector assembly of claim 20, wherein a wedge portion of each of the secondary locking mechanisms is positioned adjacent to the plurality of terminals in either the first inner housing portion or one of the pair of second inner housing portions in the secondary locking position and prevents withdrawal of the plurality of terminals in the longitudinal direction.

* * * * *